United States Patent [19]
Parsons

[11] Patent Number: 5,860,324
[45] Date of Patent: *Jan. 19, 1999

[54] MECHANICAL DRIVE ASSEMBLY INCORPORATING COUNTER-SPRING BIASED, RADIALLY-ADJUSTABLE ROLLERS

[75] Inventor: John D. Parsons, Bethel, Conn.

[73] Assignee: Norco, Inc., Ridgefield, Conn.

[*] Notice: The term of this patent shall not extend beyond the expiration date of Pat. No. 5,644,950.

[21] Appl. No.: 745,916

[22] Filed: Nov. 8, 1996

Related U.S. Application Data

[63] Continuation of Ser. No. 498,358, Jul. 5, 1995, Pat. No. 5,680,795.

[51] Int. Cl.⁶ .................................................. F16H 55/18
[52] U.S. Cl. ...................... 74/441; 74/459; 74/424.8 R
[58] Field of Search ............................ 74/459, 424.8 R, 74/441

[56] References Cited

U.S. PATENT DOCUMENTS

| | | | |
|---|---|---|---|
| 3,296,880 | 1/1967 | Maroth | 74/424.8 |
| 3,308,674 | 3/1967 | Maroth | 74/424.8 |
| 3,766,788 | 10/1973 | Metz | 74/441 |
| 3,766,800 | 10/1973 | Kennedy | 74/441 |
| 3,779,094 | 12/1973 | La Barre | 74/424.8 R |
| 4,008,625 | 2/1977 | Malhotra | 74/441 |
| 4,022,076 | 5/1977 | Metz | 74/441 |
| 4,031,765 | 6/1977 | Metz | 74/57 |
| 4,198,872 | 4/1980 | Metz | 74/57 |
| 4,199,999 | 4/1980 | Metz | 74/424.8 NA |
| 4,343,200 | 8/1982 | Alworth et al. | 74/57 |
| 5,191,805 | 3/1993 | Parsons | 74/459 |
| 5,644,950 | 7/1997 | Parsons | 74/465 |

FOREIGN PATENT DOCUMENTS

| | | |
|---|---|---|
| 1-153861 | 6/1989 | Japan . |
| 1293430 | 10/1972 | United Kingdom . |

*Primary Examiner*—Charles A. Marmor
*Assistant Examiner*—David M. Fenstermacher
*Attorney, Agent, or Firm*—H. Gibner Lehmann; K. Gibner Lehmann

[57] ABSTRACT

An anti-friction nut for engagement with an elongate shaft-like member having a groove with opposed walls. The nut body has an axial bore which is adapted to receive the shaft-like member, and a radial bore communicating with the axial bore. The radial bore carries an anti-friction roller mounted by means of two back-to-back ball bearing assemblages. A nose portion of the roller extends into the axial bore and engages one wall of the groove of the shaft-like member. There is a spring in the radial bore which engages the outer race of the inner ball bearing assemblage, and effectively biases the roller in a radially outward direction, away from the shaft-like member. A threaded adjustment plug in the bore engages the outer race of the outermost ball bearing assemblage, to effect adjustable movement of the roller in radial directions, against the action of the spring. Reduced looseness and backlash are realized.

19 Claims, 4 Drawing Sheets

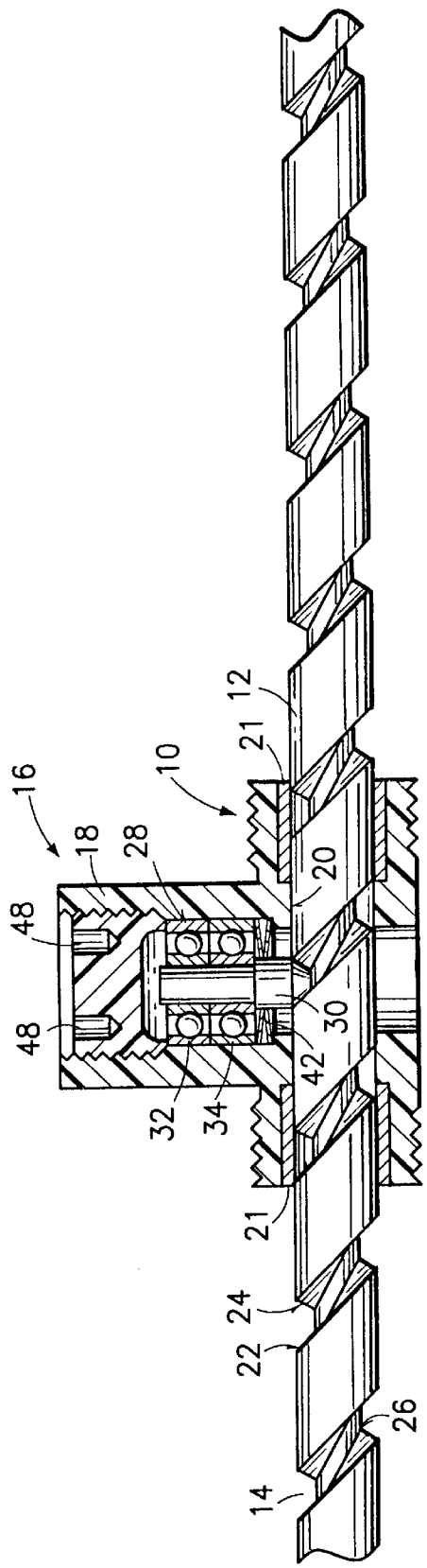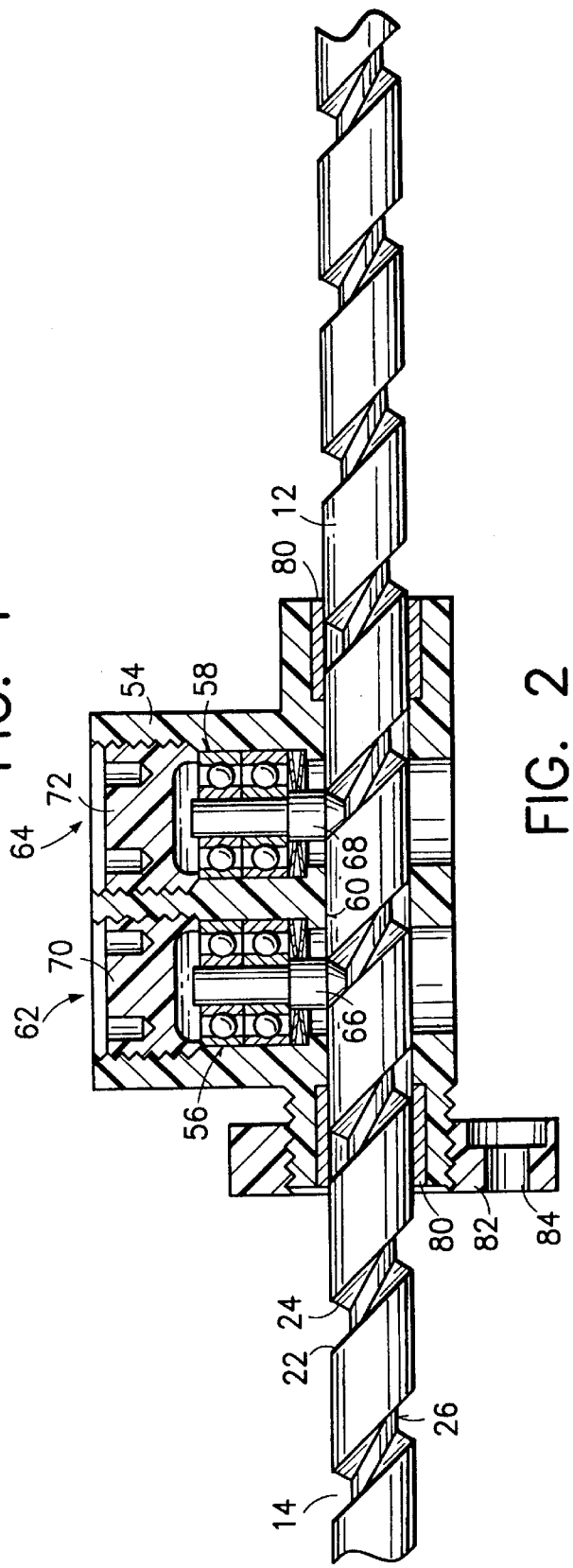

MECHANICAL DRIVE ASSEMBLY INCORPORATING COUNTER-SPRING BIASED, RADIALLY-ADJUSTABLE ROLLERS

This is a continuation of U.S. Ser. No. 08/498,358 filed Jul. 5, 1995; now U.S. Pat. No. 5,680,795.

CROSS REFERENCES TO RELATED APPLICATIONS

1. My co-pending application U.S. Ser. No. 08/333,735, filed Nov. 3, 1994, now U.S. Pat. No. 5,680,795 entitled "MECHANICAL OSCILLATOR", and having common ownership with the present application.

2. Priority under 35 USC 120 is hereby claimed, of my co-pending application U.S. Ser. No. 08/498,358 filed Jul. 5, 1995, now U.S. Pat. No. 5,680,795, and having common ownership with the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

FIELD OF THE INVENTION

This invention relates to reciprocating drive mechanisms, and more particularly to devices of the type incorporating one or more anti-friction rollers that are turnably mounted in a nut body and which extend into the axial bore of the body so as to engage the walls of a grooved or threaded shaft, such as a screw or other shaft having a roller-receiving groove.

The entire disclosure of U.S. application Ser. No. 08/333,735 above identified is specifically incorporated by reference, into the present application.

The listing of prior art set forth in the above identified application is re-produced hereinbelow:

U.S. Pat. Nos.

| | | |
|---|---|---|
| 3,296,880 | 3,308,674 | 3,766,788 |
| 3,766,800 | 3,779,094 | 4,008,625 |
| 4,022,076 | 4,031,765 | 4,198,872 |
| 4,199,999 | 4,343,200 | 5,191,805 |

British Patent No. 1044 dated Jan. 15, 1907

French Patent No. 526,586

DESCRIPTION OF THE RELATED ART INCLUDING INFORMATION DISCLOSED UNDER 37 CFR §§1.97-1.99

The present invention relates to improvements in the constructions illustrated and described in U.S. Pat. No. 3,792,616 dated Feb. 19, 1974, and U.S. Pat. No. 5,191,805 dated Mar. 9, 1993.

U.S. Pat. No. 5,191,805 describes an especially simple, miniature low-friction mechanical transmission incorporating a threaded shaft and a cooperable nut adapted to be reciprocated thereon in response to turning of the shaft. In the disclosed construction, the nut is provided with a radial bore that houses two back-to-back ball bearing assemblages and a roller having an enlarged, conical nose portion which extends into the axial bore of the nut body, for engagement with the thread grooves.

The roller is secured to the inner races of each ball bearing assemblage by means of an adhesive, such that the roller and inner races become rigid with one another, and turn as a unit. The outer races of each ball bearing assemblage are similarly secured in place in the bore, at the desired, adjusted radial position, by an adhesive. When the adhesive has dried, the roller occupies a generally fixed radial position in the radial bore, and turns as a consequence of the engagement of its conical nose with the wall surfaces of the thread groove.

This patented construction has the advantage of extreme simplicity, whereby the number of separate components is kept to an absolute minimum. In addition, the use of adhesive for securing the parts together has been found to be surprisingly cost-effective, even in view of the need for some limited manual assembly of the parts.

In spite of the success of the patented structure, there still exists a need to economize from the standpoint of utilizing components which can be standardized to an extent, so as to permit off-the-shelf selection as to screw length, diameter, pitch, and thread resolution.

While the patented construction was deemed to be acceptable for many applications, it was considered that enhanced flexibility could be attained if it were possible to provide a simple and effective means for imparting fine or incremental adjustability to the radially disposed rollers, in applications where looseness was not tolerable, or where special speed and load conditions prevailed.

The earlier patent, U.S. Pat. No. 3,792,616, relates to a mechanical oscillator or reciprocating drive which employs two roller cartridges that are respectively received in axially spaced radial bores of a nut body. The shaft has two spaced-apart endless grooves that are substantially duplications of one another. The spacing of the rollers on the nut body is such that one roller engages a wall of one groove, and the other roller engages the similarly-facing wall of the second groove. An objective of this construction was to achieve a balance between the load on each roller. As shown in FIG. 3 of the patent, the rollers each had at their radially outermost ends, spring washers which, acting through a ball bearing, biased the respective roller in a radially inward direction. Upon experiencing load, the conical configuration of the roller nose gave rise to a tendency for the roller to retract in a controlled manner, against the action of the springs. The disclosed device has enjoyed considerable success in the commercial and industrial market, since the issuance of the patent.

As in the previous U.S. patent noted above, No. '805, there was no provision in the '616 patent for fine or micro-adjustment in the radial position of the roller. In practice, the rollers were fixed in their respective roller cartridges at a position determined by the stiffness of the springs and the pressure exerted on the roller by the wall of the groove of the shaft. It was assumed that the tolerances on the various components were sufficiently close that the desired, balanced drive condition would automatically be established at the time that the unit was first entered into service.

In practice, this was not always the case, however, and attempts to improve on the patented constructions are continuously being made.

SUMMARY OF THE INVENTION

The above disadvantages and drawbacks of prior anti-friction drive assemblies are largely obviated by the present invention, which has for an object the provision of a novel and improved anti-friction nut and grooved shaft, which are simple in structure, and rugged and reliable in operation over extended periods of use.

A related object of the invention is to provide an improved anti-friction nut and grooved shaft as above set forth, which are especially adapted for high-speed operation, with a minimum of sliding or scraping of the rollers on the walls of the groove of the shaft.

Still another object of the invention is to provide an improved anti-friction nut and grooved shaft of the kind indicated, wherein the disposition of the rollers is such that they can be made essentially unidirectional in their turning movements, thereby avoiding potential problems resulting from inertia of the rollers and the inability of the rollers to turn first in one direction, suddenly halt, and thereafter turn rapidly in the opposite direction.

Yet another object of the invention is to provide an improved anti-friction nut and grooved shaft as above characterized, wherein an especially simple and relatively high-resolution adjustment of the radial position of the rollers is had, all to the end that there is minimized excessive looseness between the parts, and with no appreciable added drag on the rollers occurring as a consequence of the adjustability feature.

Still another object of the invention is to provide anti-friction nut constructions in accordance with the foregoing, which lend themselves to use with shafts that are characterized by either conventional spiral thread grooves, or single-loop type, endless grooves.

Economy of manufacture and assembly, coupled with minimal wear and convenient adjustability are thus realized, in a device utilizing relatively few components than be conveniently fabricated from steel, bronze, and molded plastic.

In accomplishing the above objects the invention provides an anti-friction nut for engagement with an elongate screw or shaft-like member having a groove with opposed walls, the nut comprising in combination a nut body having an axial bore which is adapted to receive the shaft-like member, and having a radial bore communicating with the axial bore thereof. There is an anti-friction roller having at one end a nose portion, and mounting means are provided, including an anti-friction bearing, turnably mounting the roller in the radial bore such that the nose portion of the roller extends into the axial bore and engages one wall of the groove of the shaft-like member. There is a spring carried in the radial bore of the nut body and engaging the bearing, so as to bias the roller in a radially outward direction away from the shaft-like member. Adjustment means are also provided, disposed in the radial bore of the nut body and positioned radially outwardly of the bearing, to effect adjustable movement of the roller in a radial direction. The spring normally biases the mounting means radially outward and against the adjustment means so as to take up any looseness of the parts.

The invention also provides a mechanical cam drive assembly, comprising in combination a first member having a spiral groove with opposed walls and characterized by a predetermined pitch measured along an axis thereof, and a second member comprising a nut body cooperable with the first member. The nut body has radial bores and a plurality of anti-friction rollers turnably mounted therein, respectively. The rollers each have a nose portion which projects from its respective radial bore, and which engages the walls of the groove of the first member. The rollers are spaced apart axially along the first member, by a distance which is a micro-fraction larger than the pitch of the groove of the first member.

The invention further provides a mechanical cam drive assembly, comprising in combination a first member having two grooves each with opposed walls, and a second member comprising a nut body cooperable with the first member. The nut body has radial bores which carry a plurality of anti-friction rollers respectively, the rollers each having at one end a nose portion which projects from its radial bore. The nose portions are engageable with walls of the grooves of the first member. The rollers are spaced apart about the first member such that one roller continuously engages one wall of one of the grooves, and another roller continuously engages an oppositely-facing wall of the other of the grooves.

The arrangement is such that each roller can, at all times, be positively backed up and rigidly engaged by the adjustment means associated with it, and thus cannot move radially outward from an intermediate position in its radial bore, even in the presence of a momentary high load.

Setting of the adjustment means is accomplished manually, in such a manner as to either reduce backlash, or alternately equalize the load on two or more rollers.

Other features and advantages will hereinafter appear.

BRIEF DESCRIPTION OF THE DRAWINGS

In the drawings, illustrating several embodiments of the invention:

FIG. 1 is a front view, partly in elevation and partly in axial section, of a mechanical drive assembly comprising an anti-friction nut carried on a screw.

FIG. 2 is a view like FIG. 1, of a modified mechanical drive assembly, constituting another embodiment of the invention.

FIG. 2; and FIG. 6, respectively.

DESCRIPTION OF THE PREFERRED EMBODIMENTS

Figure 3:
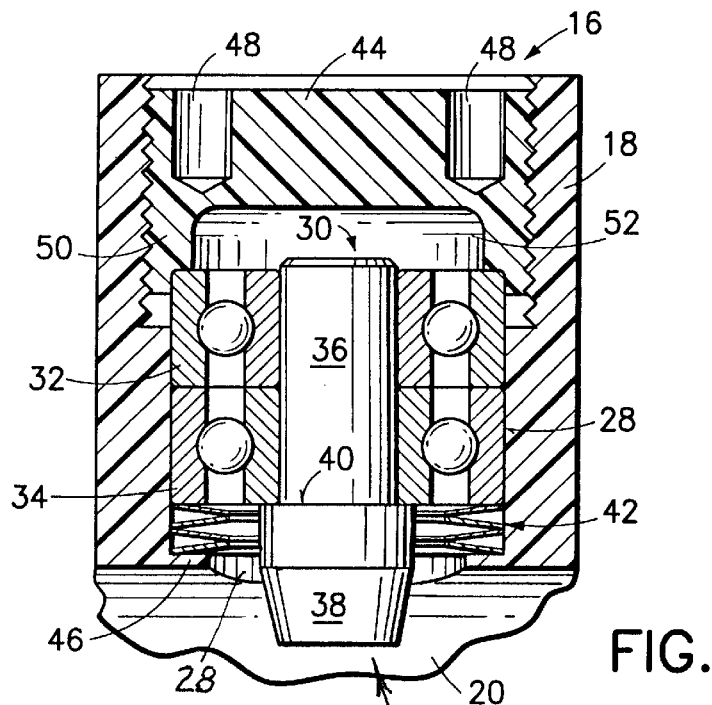
FIG. 3 is a fragmentary axial section of the nut body of the drive assembly of FIG. 1.

Referring first to FIG. 1, there is illustrated a mechanical drive assembly which is generally designated by the numeral 10, comprising a first member in the form of a shaft or screw 12 having a spiral thread groove 14, and a second member comprising an anti-friction nut 16. The latter includes an elongate nut body 18 shown in FIG. 3, which has an axial bore 20 to receive the screw 12. Preferably, end bearings in the form of bronze sleeves 21 are provided, disposed in annular recesses of the nut body 18.

The nut body 18 is adapted to traverse the screw 12 when the latter is turnably driven by suitable powered means (not shown). The groove 14 in the screw 12 has opposed, facing walls 22 and 24, and a bottom wall 26.

The nut body 18 (FIG. 3) is provided with an anti-friction groove-engagement means 27, adapted to be carried in a radial bore 28 which extends into and communicates with the axial bore 20 thereof. The anti-friction groove-engagement means 27 is turnably mounted in the radial bore 28 and comprises a roller 30 which is mounted in anti-friction bearings, the latter preferably taking the form of back-to-back ball bearing assemblages 32 and 34. The roller 30 comprises an elongate shank portion 36, and at its inner end, a nose portion 38. The shank portion 36 is of reduced diameter with respect to the nose portion 38, and the two portions meet at an annular shoulder 40. The nose portion 38 is adapted to extend into the axial bore 20 of the nut body 18, for engagement with one or the other of the walls 22, 24 of the spiral groove 14 of the screw. The nose portion is, however, spaced a finite distance from the bottom of the groove, so as to avoid contact therewith and possible scraping thereagainst.

In accordance with the present invention, the anti-friction groove-engagement means 27 comprising the roller 30, not only provides an especially simple overall mounting structure, but also permits an unusually quick and easy manual adjustment of the radial position of the roller 30 to be had with a remarkably high degree of resolution and precision. In accomplishing this improved mounting, there are provided in combination with the ball bearing assemblages 32 and 34, an adjustment means and a resilient spring means, the latter biasing and positioning the roller 30 in a radially outward direction, and comprising resilient bowed spring washers 42; the adjustment means comprises a threaded adjustment plug 44 that is carried in the bore 28 and disposed radially outwardly of the roller 30.

By the invention, the radial bore 28 has an inner shoulder 46 adjacent to the axial bore 20 of the nut body, constituting a seat for the spring washers 42. In a preferred embodiment, multiple spring washers 42 are utilized in back-to-back relation, typically two or four in number. In FIG. 3, one of the spring washers 42 occupies the seat formed by the shoulder 46. Countering the force of the washers 42 is the threaded adjustment plug 44. The radially outermost portion of the bore 28 is internally threaded as shown, and the mating external threads of the plug 44 enable its radial position to be manually adjusted as needed, utilizing a suitable tool or instrument (not shown). In the form shown, the plug 44 has two off-center keying holes 48 into which the tines of such an instrument are inserted, during the adjustment.

Also, in accordance with the invention the mounting arrangement for the roller 30 is such that neither the shank 36 nor the nose portion 38 thereof is directly engaged by either the spring washers 42 or the threaded adjustment plug 44. As shown in FIG. 3, where four spring washers 42 are utilized, the periphery of the radially innermost spring washer engages the shoulder 46 of the nut body. The periphery of the radially outermost spring washer 42 engages solely the outer race of the inner ball bearing assemblage 34, with the holes in the spring washers 42 being sufficiently large so as to completely clear the enlarged nose portion 38 of the roller 30.

Similarly, the inner end of the threaded adjustment plug 44 is provided with an annular shoulder 50 defining a clearance recess 52. The shoulder 50 is dimensioned to engage solely the outer race of the radially outermost ball bearing assemblage 32, as shown. Thus, the roller 30 per se engages solely the inner races of the ball bearing assemblages 32, 34, and no interference with free turning is encountered by the roller 30, either from the plug 44 or the spring washers 42.

In the preferred embodiment, the roller 30 can be permanently and rigidly secured to the inner races of the ball bearing assemblages 32, 34 by suitable adhesive, such as that manufactured under the trademark LOCKTITE brand adhesive. Under such circumstances, the radially innermost ball bearing assemblage 34 is positioned with its inner race firmly against the shoulder 40, and the radially outermost ball bearing assemblage 32 abuts the inner ball bearing assemblage 34. The outer races of each ball bearing assemblage are of a dimension to allow a free-sliding fit with the walls of the radial bore 28 of the nut body 18, such that the two ball bearing assemblages 32, 34 and secured roller 30 move radially in the bore 28, as a unitary assembly.

The spring washers 42 thus operate to bias the radially outermost ball bearing assemblage 32 into continuous engagement with the annular shoulder 50 of the threaded adjustment plug 44; as the latter is turned, the roller 30 and ball bearing assemblages 32, 34 move as a unit, either radially inwardly or outwardly, the spring washers 42 maintaining an essentially continuous contact and engagement between the radially outermost bearing assemblage's outer race and the threaded adjustment plug 44. The adjustment plug 44 thus can vary the radial position of the roller 30 with respect to the nut body 18, simultaneously compressing the spring washers 42 by a greater or lesser amount depending on the direction of turning of the plug 44.

Figure 5:
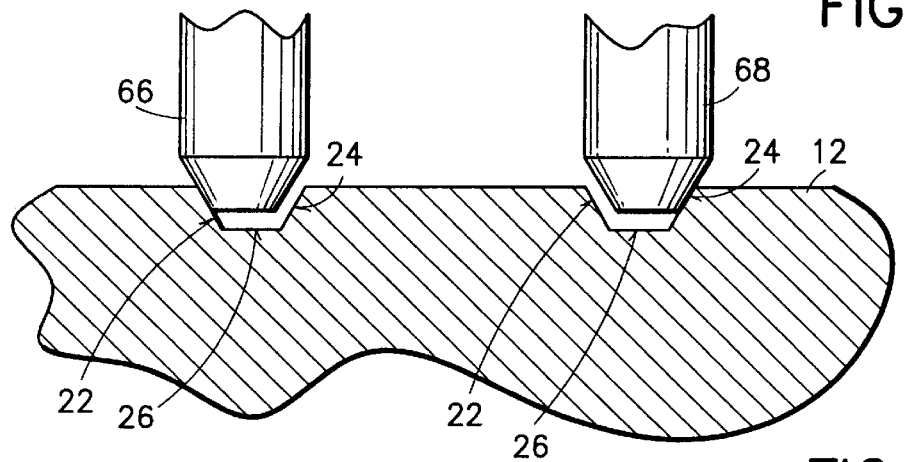
FIG. 5 is a diagrammatic representation of the screw portion of the mechanical drive assembly of FIG. 2, and illustrating anti-friction rollers of the nut, and wherein the roller spacing measured axially of the screw is a micro-fraction greater than the pitch or lead of the screw, constituting another embodiment of the invention.

Another embodiment of the invention is illustrated in FIGS. 2 and 5, wherein advantage is taken of the roller adjustment to eliminate lost motion in a screw drive device of the kind described above. In this embodiment, two roller assemblages are arranged in tandem in a multi-cavity nut body having two radial bores extending into a single axial screw-accommodating bore. As shown, there is provided on the screw 12, the nut body 54 having radial bores 56 and 58 which merge into a common axial bore 60. The nut body 54 carries first and second anti-friction groove-engagement means 62 and 64, respectively which are identical to the anti-friction groove-engagement means 27 described above in connection with FIGS. 1 and 3. The axial spacing between the first and second radial bores 56 and 58 respectively can be chosen to be equal to a multiple of the pitch of the thread groove 14 plus or minus a small micro-fraction of the pitch, as will be explained hereinbelow.

The roller 66 of the groove-engagement means 62 is identical to roller 30, having an elongate shank portion and a nose portion which extends into the axial bore 60, the two portions meeting at an annular shoulder. The roller 68 of the second groove-engagement means 64 also has a nose portion which extends into the axial bore 60 of the nut body 54. The nose portions are arranged for selective engagement with walls 22, 24 of the spiral groove 14 of the screw.

The mounting arrangements for rollers 66 and 68 are substantially the same as that described above in connection with roller 30. First and second spring means respectively bias the rollers 66 and 68 in radially outward directions, and adjustment means comprising first and second adjustment plugs 70, 72 are carried in the bores 56, 58 respectively and disposed radially outwardly of the rollers 66, 68. Each radial bore has an inner shoulder adjacent to the nut body's axial bore 60. Such shoulders are similar to that indicated 46 in FIG. 3, and each constitutes a seat for the respective spring means. As with the roller 30, the spring means for each of the rollers 66, 68 preferably comprises either two or four back-to-back resilient spring washers. Countering the force of the spring means are the plugs 70, 72. The radially outermost portions of the bores 56, 58 are internally threaded as shown, to accommodate the plugs 70, 72.

The first and second plugs 70, 72 can optionally have one or more offset key holes similar to those indicated 48 in FIG. 3, which can accept the tines (not shown) of an adjustment tool during adjustment of the rollers 66, 68 respectively.

As previously noted in connection with the embodiment of FIGS. 1 and 3, in the case of the embodiment of FIG. 2, neither the shank nor the nose portion of either roller 66, 68 is directly engaged by the respective spring washers (corresponding to spring washers 42 in FIG. 3) or by the adjustment plugs 70, 72. Where four back-to-back spring washers are used in each bore 56, 58, the innermost spring washer engages the respective shoulder (corresponding to shoulder 46 of FIG. 3), whereas the outermost washer engages solely the outer race of the radially innermost ball bearing assemblage (corresponding to ball bearing assemblage 34 in FIG. 3). The peripheries of the spring washers surround but do not contact the enlarged nose portions respectively, of the rollers 66, 68, the holes in the spring washers instead being sufficiently large to effect such clearance.

In addition, each adjustment plug 70, 72 has an annular shoulder which engages solely the outer race of the radially outermost ball bearing assemblage (corresponding to ball bearing assemblage 32 in FIG. 3), as shown. Again, there occurs no impediment to free turning of either roller 66 or 68, from the plugs 70, 72 or from the spring washers.

The roller 66 is permanently and rigidly secured to both inner races of its ball bearing assemblages by suitable adhesive, such as that manufactured under the trademark LOCKTITE brand adhesive. The radially innermost ball bearing assemblage is positioned with its inner race firmly against the shoulder of the roller 66, and the radially outermost ball bearing assemblage abuts the radially innermost ball bearing assemblage. The outer races of each ball bearing assemblage are of a dimension to allow a free-sliding fit with the walls of the radial bore 56, such that the two ball bearing assemblages and secured roller 66 move radially in the bore, as a unitary assembly.

A similar arrangement is provided for roller 68, with respect to its ball bearing assemblages.

In the case of roller 66, the spring washers thus operate to bias its radially outermost ball bearing assemblage into continuous engagement with the annular shoulder of the adjustment plug 70; as the latter is turned, the assembly of roller 66 and ball bearing assemblages moves radially inwardly or outwardly, the spring washers maintaining the essentially continuous contact and engagement between the outer race of the radially outermost ball bearing assemblage and the threaded plug 70. The threaded plug 70 thus varies the radial position of the roller 66 with respect to the nut body 54, and simultaneously compresses the spring washers by a greater or lesser amount, depending on the direction of turning of the plug 70.

The same is true of the threaded plug 72 and the roller 68.

The disclosed arrangement involving two rollers 66, 68 turnably carried respectively in two, axially spaced radial bores 56, 58 can be advantageously utilized to provide either a substantially increased load capability for the nut body 54 and screw 12, or a reduced backlash feature, depending upon the disposition of the one radial bore 56 with respect to the other radial bore 58.

In the case where the axial spacing between the radial bores 56, 58 is equal to the pitch of the groove 14 in the screw 12 plus a micro-fraction thereof; or alternately, is equal to a multiple of such pitch plus a micro-fraction thereof, the resulting spacing of the rollers 66, 68 will be such as to cause one roller 66 to engage one wall 22 of the groove 14, while the other roller 68 engages the oppositely-directed wall 24 of the groove 14, as diagrammatically illustrated in FIG. 5. This has the advantage of reducing backlash between the nut body 54 and screw 12, in that for relatively light loads, one roller 66 carries substantially the entire load when the nut body 54 is traversing the screw 12 in one axial direction, with the other roller 68 carrying substantially the entire load when the nut body 54 is traversing the screw 12 in the opposite axial direction. At the points where the axial direction of the load reverses, the lost motion, constituting backlash, can be considerably reduced over that obtainable with a single roller. In effect, the engagement of the rollers with their respective, opposed groove walls tends to maintain the nut body in a defined central position, in an axial sense with respect to the axis of the screw. This construction is in contrast to that where a single roller is employed, and where the roller must shift, at a point of load reversal, from engagement with one groove wall, for example wall 22, to the opposite groove wall, for example wall 24, the shift giving rise to excessive looseness or backlash.

Figure 4:
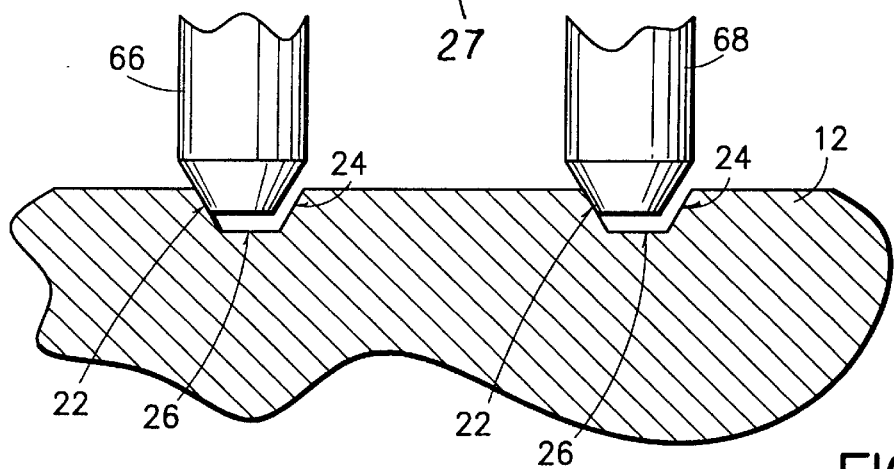
FIG. 4 is a diagrammatic representation of the screw portion of the mechanical drive assembly of FIG. 2, and illustrating anti-friction rollers of the nut, and wherein the roller spacing measured axially of the screw is substantially the same as the pitch or lead of the screw.

On the other hand, if low backlash is not the primary concern, the radial bores 56, 58 in the nut body 54 can be spaced axially by a distance which is substantially equal to the groove pitch or a multiple thereof, with no correction or deviation. Such a condition is diagrammatically illustrated in FIG. 4, wherein by suitable adjustment of the threaded plugs 70 and 72, the rollers 66, 68 can be set to substantially equally share the load. In practice, there does not occur a truly equal division of load between the rollers 66, 68 in FIGS. 2 and 4, because of imperfections in the screw as it is traversed along its length, and also variations in groove concentricity, as from less than ideal manufacturing tolerances. Typically, the screws are produced in a conventional screw machine, and with time, the components of the machine suffer wear, which in turn compromises uniformity in their thread/groove formations in the screws produced thereby.

It is noted that with the present invention, each roller 66, 68 occupies an intermediate radial position in its respective radial bore 56, 58. The exact positions are determined by manual adjustment of the respective threaded plugs 70, 72, typically in alternating fashion, against the counterforces of the spring washers (corresponding to spring washers 42 of FIG. 2).

It is further noted that with the disclosed arrangement, in each case the threaded plugs 70, 72 positively back up and support the respective rollers 66, 68, through the ball bearing assemblages. This construction is in contrast to some prior constructions where anti-friction rollers were spring biased radially inwardly into engagement with the walls of a grooved shaft. With the present invention, there is virtually no radially outward yielding of either roller 66 or 68 in response to a load applied thereto, which is considered to result in improved load-handling capability between the shaft and nut body.

Figure 10:
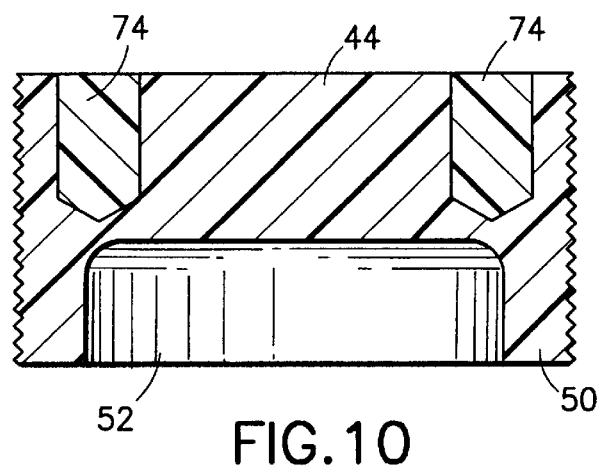
FIG. 10 is a vertical section of a threaded adjustment plug utilized in the anti-friction nuts of the mechanical drive assemblies of FIGS. 1 and 3.

Further, referring again to FIG. 3 and in accordance with the invention the threaded plug 44, once set, can be rendered largely tamper-resistant by filling its keying holes 48 with a quantity 74 of suitable cement or epoxy, as in FIG. 10. Once cured, the epoxy 74 effectively prevents subsequent insertion of the adjustment tool (not shown) utilized to initially advance or retract the plug 44 toward its desired, adjusted position.

Also by the invention, a small quantity of cement is applied to the threads of the plugs 70, 72 after they have been initially set. A preferred form of cement is that sold under the Trademark LOCKTITE brand adhesive, which can be of the type especially formulated to readily flow around the interstices of a thread form and thereafter solidify. However, other adhesive formulations may be utilized, if desired.

Figure 11:
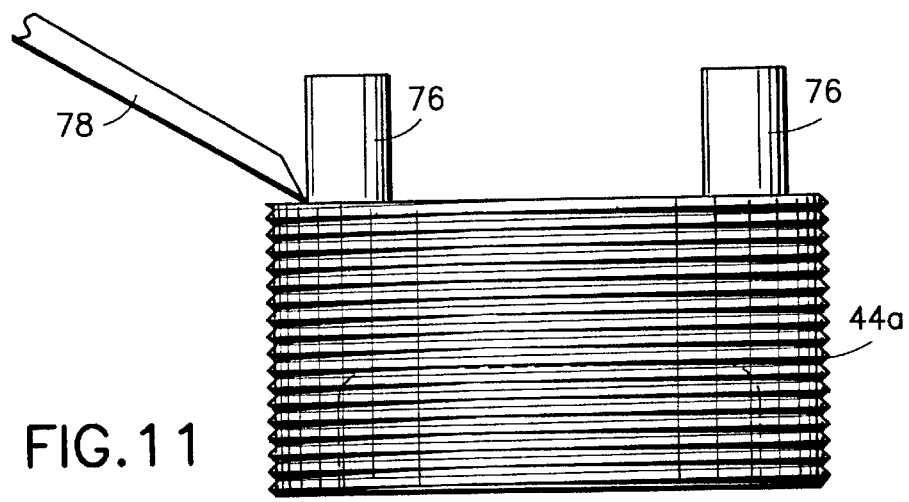
FIG. 11 is a vertical section of a modified threaded plug, having projecting prongs to facilitate its adjustment, and showing a chisel being applied to the prongs following adjustment, so as to shear them off and render the plug tamper-resistant.

An alternate tamper-resistant feature applicable to the threaded plug 44 of FIG. 3 is shown in FIG. 11, illustrating a modified plug 44a having two upstanding posts 76 by which the plug can be initially engaged and turned in its radial bore. Following adjustment and application of a cement to the threads of the plug 44a, a chisel 78 or other sharp tool is utilized to shear off the posts 76, thereby leaving a relatively smooth surface that is devoid of any remaining tool-engageable projections. In combination with the cemented threads, the lack of any such projections on the upper surface of the plug 44a effectively discourages attempts to subsequently re-adjust the plug, which is considered important from the standpoint of reliability; strictly speaking, the proper, initial adjustment is intended to be carried out at the manufacturing facility. Any attempts at re-adjustment in the field are considered best avoided. The tamper-resistant feature just described is enhanced in the case that the upper surface of the plug 44 is recessed into the bore 28 as shown in FIG. 3. The existence of the recess renders the outer surface of the plug still more difficult to access, further discouraging any subsequent attempts at re-adjustment.

Further, in accordance with the present invention the nut body 54 is preferably constituted of plastic substance, such as DELRIN (a registered trademark) brand plastic, or polycarbonate, the latter material being especially adapted for molding multiple units in mass production; in addition, in FIG. 2 the axial bore 60 of the nut body 54 is provided with spacer means in the form of slide bearings 80 preferably constituted of bronze. These bearings thus eliminate any physical contact between plastic and metal, namely the plastic body and the steel screw. This feature is considered important from the standpoint of ruggedness and long life, since sliding contact between a plastic body and a grooved or threaded shaft, would likely lead to deterioration or abrasion of the plastic. With the present construction, such a possibility is completely obviated.

In the embodiment of FIG. 2, one end of the nut body 54 is provided with an externally threaded portion, which mates with corresponding carriage plate 82 having one or more mounting holes 84, for securement of the nut body 54 to the equipment (not shown) with which the mechanical drive assembly is to be utilized. In the embodiment of FIG. 1, there are two threaded portions, and it can be understood that either or both are available for securement to equipment (not shown) by means of plates similar to that designated 82 in FIG. 2.

Figure 6:
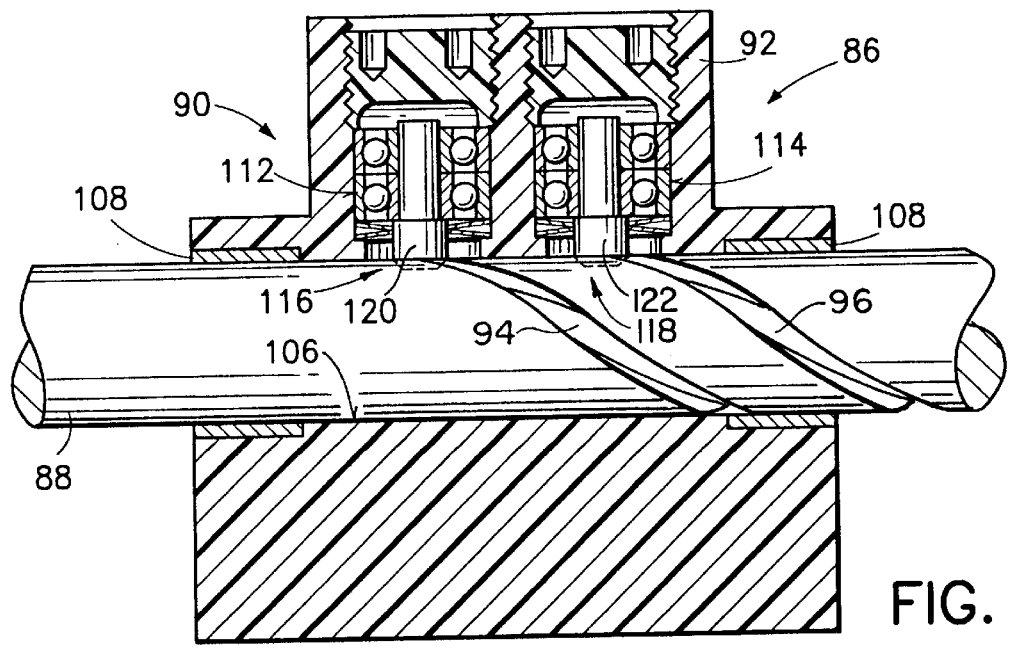
FIG. 6 is a front view, partly in elevation and partly in axial section, of a reciprocating mechanical drive assembly comprising a shaft having two endless grooves spaced from one another, and comprising an anti-friction nut carried on the shaft, constituting yet another embodiment of the invention.
Figure 7:
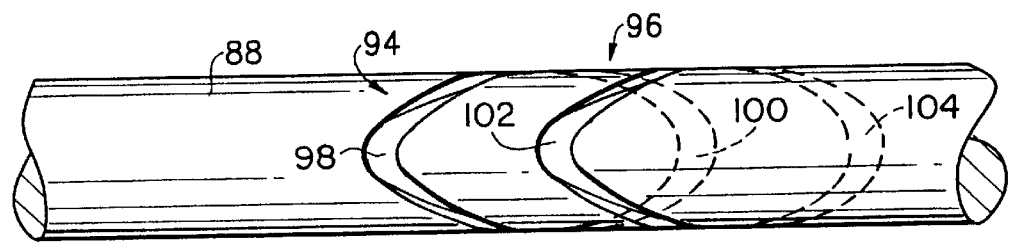
FIG. 7 is a front elevation of the shaft per se, of FIG. 6.
Figure 9:
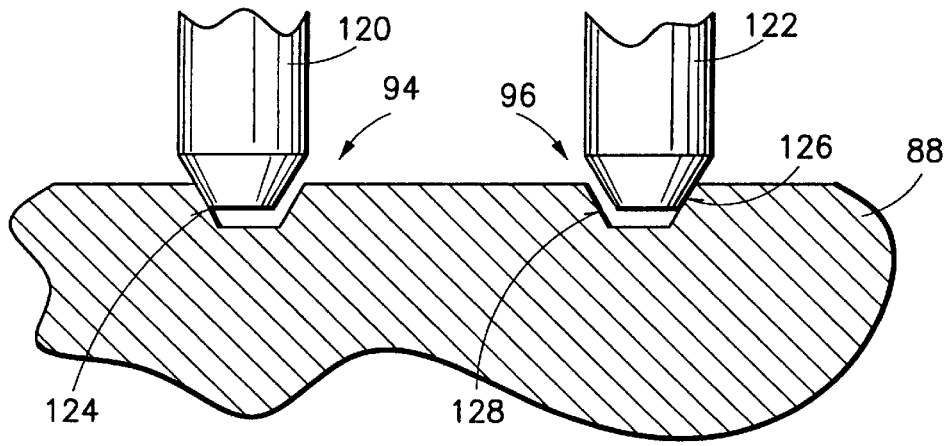
FIG. 9 is a diagrammatic representation of the shaft of FIGS. 6 and 7, illustrating anti-friction rollers carried by the nut of FIG. 6, and wherein the roller spacing measured axially of the shaft is a micro-fraction greater than the axial spacing between the endless grooves thereof.

Yet another embodiment of the invention is illustrated in FIGS. 6, 7 and 9, wherein there is provided a reciprocating drive mechanism generally designated by the numeral 86, comprising a grooved shaft 88 and an anti-friction nut 90 comprising a nut body 92. The shaft 88 has a pair of axially spaced-apart endless grooves 94, 96, having reversing portions 98, 100 and 102, 104, respectively and spiral groove portions that are intermediate their reversing portions. The nut body 92 has an axial bore 106 fitted with sleeve bearings 108. By the invention there are provided two spaced radial bores 112, 114, and the nut body 92 carries first and second anti-friction groove-engagement means 116, 118, respectively which are identical to the anti-friction groove-engagement means 27 described above in connection with FIGS. 1 and 3, and to the anti-friction groove-engagement means 62, 64 of the embodiment of FIG. 2.

The groove engagement means 116, 118 comprises anti-friction rollers 120, 122 corresponding to the rollers 66, 68 of the embodiment of FIG. 2. As in the previous embodiments the rollers are carried on ball bearing assemblages, two bearing assemblages per roller, and spring means are included at the inner ends of the bores 112, 114, engageable with shoulders in each bore corresponding to the shoulder 46 of FIG. 3. The inner races of the ball bearing assemblages are rigid with the respective roller, as by either a press fit, or with the use of adhesive, and the outer races of the ball bearing assemblages are received in the respective radial bores with a sliding fit. Adjustment plugs similar to those of the previous embodiments are provided, disposed radially outward of the respective rollers.

By the invention, the rollers 120, 122 are mounted in substantially a single axial plane (not shown) that bisects the shaft 88 axially, and the spacing between the rollers 120 and 122, measured axially of the shaft, is just slightly greater than the axial spacing between the grooves 94 and 96, measured center to center. Each roller 120, 122 occupies an intermediate position in its bore, and the arrangement is such that by adjustment of the respective threaded plugs, one roller 120 engages the one wall 124 of the first groove 94, and the second roller 122 engages the oppositely facing wall 126 of the second groove 96, as diagrammatically depicted in FIG. 9.

The feature just described, wherein one roller always engages solely one wall of one groove, and the other always engages the oppositely facing wall of the other groove has important advantages that are not readily apparent upon a first or cursory inspection.

In particular, under high speed conditions involving a driven shaft 88 and a reciprocating nut 90, the rollers 120 and 122 are forced to turn at a significantly higher r. p. m. than the shaft 88, due to the relatively small diameters of the nose portions of the rollers. As a consequence, the inertia of the rotating rollers 120, 122 becomes significant. By the present invention, there is completely eliminated the necessity to overcome the inertia occasioned by a complete halt and subsequent (almost instantaneous) reversal of the direction of rotation of a roller, since each roller 120, 122 always rotates about its axis in the same direction, but at a speed depending upon the particular region of its own groove that is being traversed.

This arrangement is in sharp contrast to modes of operation of the devices of the prior art, wherein there occurred shifting of a roller element between one wall of a groove and the other, as required during a reversal of axial movement of a nut. The requirement of having to reverse a rotating roller abruptly, of necessity placed significant restraints on the permissible speed of operation of the device, since the friction between the individual rollers and the walls of the thread grooves was limited; if the speed were increased beyond a certain point, there arose a tendency for a roller to not reverse turning at all, but instead adopt a sliding-type movement in its groove. Sliding occurred because it was not possible to instantaneously halt the roller at the end of the groove and immediately impart a full, reverse turning movement to it as the nut reversed direction.

The present construction obviates the problems associated with roller reversal, in that each roller turns unidirectionally, for a given sense of relative turning of the shaft and nut body. Greatly increased speed is realizeable, along with increased load-carrying capability, and significantly reduced wear as occasioned by the rollers rolling against the walls of the groove instead of sliding against these walls. In preferred form, the taper of the nose portions of the rollers matches the taper of the grooves in the shaft, so as to maximize the tendency for rolling movement of a roller along a groove wall, as opposed to an undesirable sliding therealong.

Figure 8:
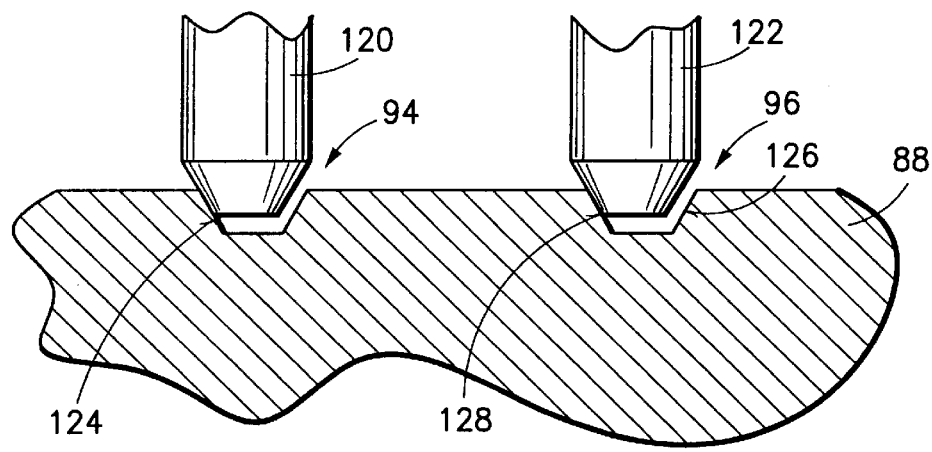
FIG. 8 is a diagrammatic representation of the shaft of FIGS. 6 and 7, illustrating anti-friction rollers carried by the nut of FIG. 6, and wherein the roller spacing measured axially of the shaft approximates the axial spacing between the endless grooves thereof.

A modification of the construction of FIGS. 6, 7 and 9, is indicated diagrammatically in FIG. 8. By the invention, the radial bores housing the rollers 120, 122 are disposed such that the axial spacing between the rollers is substantially equal to the axial spacing between the grooves 94, 96, measured center to center. Each roller occupies an intermediate position in its bore, and the arrangement is such that by adjustment of the plugs, both rollers 120 and 122 can be set so as to engage the similarly-directed or similarly-facing walls 124, 128, FIG. 8, of the respective grooves 94 and 96, and to share or divide the load to at least some extent. In practice, with variations in groove spacing as typically encountered in manufacturing, slight irregularities arise in the spacing between different parts of the grooves 94 and 96; the overall effect of the rollers being positioned in this manner is to smooth out any impulse-type movements which might otherwise occur with a single roller, and to provide a generally balanced drive, where the average load of each roller, over a complete reciprocation of the nut body, is generally shared with the other.

The embodiment of FIG. 8 does not enjoy the advantage noted above in connection with the embodiment of FIG. 9, in that there does occur reversal of the direction of turning of each roller, typically at the opposite ends of the grooves, the exception being where the load that is applied to the nut is always in one direction and wherein load varies between a relatively large unidirectional load to a smaller unidirectional load, as might be encountered in an application where the shaft was disposed vertically or at an upright angle, and the load was effected by the constant pull of gravity on a weight, for example.

In other respects the structure of the embodiment of FIG. 8 is similar to that of the previous embodiment.

From the above it can be seen that I have provided novel and improved mechanical cam drives which are both simple in their structures, and which are especially adaptable for applications which require low or "zero" backlash. The embodiment of FIGS. 6, 7 and 9 also features the capability of high-speed operation and extended life, by virtue of the unidirectional rotation of the anti-friction rollers 120 and 122.

The disclosed devices are thus seen to represent a distinct advance and improvement in the field of mechanical transmissions.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. An anti-friction nut for engagement with an elongate shaft-like member having a groove with opposed walls, said nut comprising in combination:

a) a nut body having an axial bore which is adapted to receive the elongate shaft-like member, b) said nut body having a radial bore communicating with the axial bore thereof, c) an anti-friction roller having at one end a nose portion, d) mounting means including an anti-friction bearing, turnably mounting the roller in the radial bore such that the nose portion of the roller extends into said axial bore and engages one wall of the groove of said elongate shaft-like member, e) a spring carried in the radial bore of the nut body, said spring engaging said bearing and thereby biasing the roller in a radially outward direction away from said elongate shaft-like member, and f) adjustment means carried by the nut body in said radial bore and disposed radially outwardly of said bearing, said adjustment means being operable to positively back up and effect adjustable movement of the roller in radial directions, g) the engagement of said spring with the bearing acting to bias the latter radially outward against said adjustment means so as to take up any looseness of the bearing, h) the radial position of said roller being adjustable, in a substantially stepless manner, by said adjustment means.

2. An anti-friction nut as claimed in claim 1, wherein the walls of the groove of the elongate shaft-like member are tapered, and wherein the nose portion of the anti-friction roller has a tapered configuration to mate with a tapered wall of the groove of the elongate shaft-like member.

3. An anti-friction nut as claimed in claim 1, wherein:

a) said nut body is elongate and has a second radial bore communicating with the axial bore thereof, b) a second anti-friction roller having at one end a nose portion, c) additional mounting means including a second anti-friction bearing, turnably mounting the second roller in the second radial bore such that the nose portion of the second roller extends into said axial bore and engages said one wall of the groove of said elongate shaft-like member, d) a second spring carried in the second radial bore of the nut body, said second spring engaging said second bearing and biasing the second roller in a radially outward direction away from said elongate shaft-like member, and e) additional adjustment means carried by the nut body in said second radial bore and disposed radially outwardly of said second bearing, said adjustment means being operable to effect adjustable movement of the second roller in radial directions, f) said second spring biasing said additional mounting means radially outward and against said additional adjustment means so as to take up any looseness of said additional mounting means.

4. An anti-friction nut as claimed in claim 3, wherein:

a) said elongate shaft-like member comprises a screw whose threads are characterized by a predetermined nominal thread pitch, and which threads define between them, said groove, b) both of said rollers being positioned in said nut body so as to contact the same wall of said groove, such that one or the other roller can assume the load if there is encountered an irregularity in the pitch of the elongate shaft-like member as the latter is traversed by the nut body.

5. An anti-friction nut as claimed in claim 3, wherein:

a) said elongate shaft-like member contains an additional groove, said grooves being endless and axially spaced-apart, b) said rollers being positioned in said nut body so as to contact the similarly-facing walls of both of said endless grooves respectively, so as to tend to distribute the load between each roller and its respective wall.

6. An anti-friction nut as claimed in claim 1, wherein:

a) the groove of said elongate shaft-like member has a bottom wall, and b) the nose portion of the roller being spaced a finite distance from said bottom wall so as to avoid inadvertent contact therewith.

7. An anti-friction nut as claimed in claim 1, wherein:

a) said anti-friction bearing comprises two end-to-end ball bearing assemblages, each ball bearing assemblage having an inner race that is rigid with the roller, and each ball bearing assemblage having an outer race that slidably engages the wall of the radial bore, b) said spring acting on the outer race of one ball bearing assemblage so as to bias it and the roller radially outwardly.

8. An anti-friction nut as claimed in claim 7, wherein:

a) said spring acts on the outer races of said end-to-end ball bearing assemblages so as to bias the assemblages and the roller radially outwardly.

9. An anti-friction nut as claimed in claim 7, wherein the outer races of the ball bearing assemblages move radially of the nut body.

10. An anti-friction nut as claimed in claim 1, wherein:

a) said nut body is elongate and has a second radial bore communicating with the axial bore thereof, b) a second anti-friction roller having at one end a nose portion, c) additional mounting means including a second anti-friction bearing, turnably mounting the second roller in the second radial bore such that the nose portion of the second roller extends into said axial bore and engages the other of said walls of the groove of said elongate shaft-like member, d) a second spring carried in the second radial bore of the nut body, said second spring engaging said second bearing and biasing the second roller in a radially outward direction away from said elongate shaft-like member, and e) additional adjustment means carried by the nut body in said second radial bore and disposed radially outwardly of said second bearing, said adjustment means being operable to effect adjustable movement of the second roller in radial directions, f) said second spring biasing said additional mounting means radially outward and against said additional adjustment means so as to take up any looseness of said additional mounting means.

11. An anti-friction nut as claimed in claim 10, wherein:

a) said elongate shaft-like member contains an additional groove, both of said grooves being endless and axially spaced-apart, b) said rollers being positioned in said nut body so as to contact the oppositely-facing walls of said endless grooves, respectively, so as to reduce looseness between the elongate shaft-like member and the nut body and thus overcome backlash therebetween.

12. An anti-friction nut as claimed in claim 1, wherein:

a) said anti-friction bearing comprises a ball bearing assemblage having an inner race that is rigid with the roller, and having an outer race that slidably engages the wall of the radial bore, b) said spring acting on the outer race of said ball bearing assemblage so as to bias it and the roller radially outwardly.

13. An anti-friction nut as claimed in claim 1, wherein:

a) said nut body is constituted of plastic, and b) metal sleeve bearings disposed at spaced intervals in said axial bore of the nut body, c) said sleeve bearings constituting spacers between the plastic nut body and the elongate shaft-like member, so that the latter does not physically contact or frictionally rub against the plastic nut body during operation of the anti-friction nut.

14. An anti-friction nut as claimed in claim 1, wherein:

a) said nut body has an additional radial bore communicating with the axial bore thereof, b) an additional anti-friction roller having at one end a nose portion, c) additional mounting means including an additional anti-friction bearing, turnably mounting the additional roller in the additional radial bore such that the nose portion of the additional roller extends into said axial bore and engages the opposite wall of the groove of said elongate shaft-like member, d) an additional spring carried in the additional radial bore of the nut body, said additional spring engaging said additional bearing and thereby biasing the additional roller in a radially outward direction away from said elongate shaft-like member, and e) additional adjustment means carried by the nut body in said additional radial bore and disposed radially outwardly of said additional bearing, said additional adjustment means being operable to positively back up and effect adjustable movement of the additional roller in radial directions, f) the engagement of said additional spring with the additional bearing acting to bias the latter radially outward against the additional adjustment means so as to take up any looseness of the additional bearing, g) the axial spacing of said rollers being different from the pitch of the groove of said elongate shaft-like member, such that the first roller engages one wall of said groove and the additional roller engages the opposite wall of said groove during movement of the nut along the elongate shaft-like member.

15. An anti-friction nut as claimed in claim 1, wherein said elongate shaft-like member has an additional groove, both of said grooves being endless, and being spaced apart from one another, and wherein:

a) said nut body has an additional radial bore communicating with the axial bore thereof, b) the nose portion of said anti-friction roller engaging a wall of one groove, c) an additional anti-friction roller having at one end a nose portion, d) additional mounting means including an additional anti-friction bearing, turnably mounting the additional roller in the additional radial bore such that the nose portion of the additional roller extends into said axial bore and engages the an oppositely-facing wall of the other of said grooves of said elongate shaft-like member, e) an additional spring carried in the additional radial bore of the nut body, said additional spring engaging said additional bearing and thereby biasing the additional roller in a radially outward direction away from said elongate shaft-like member, and f) additional adjustment means carried by the nut body in said additional radial bore and disposed radially outwardly of said bearing, said additional adjustment means being operable to positively back up and effect adjustable movement of the additional roller in radial directions, g) the engagement of said additional spring with the additional bearing acting to bias the latter radially outward against the additional adjustment means so as to take up any looseness of the additional bearing, h) the axial spacing of said rollers along the nut body being different from the spacing of said grooves of said elongate shaft-like member, such that the first roller engages one wall of said one groove, and the additional roller engages the opposite wall of the other of said grooves during movement of the nut along the elongate shaft-like member.

16. An anti-friction nut as claimed in claim 15, wherein:

a) said grooves are essentially coextensive with one another, and each groove having reversing portions and spiral portions intermediate the reversing portions of the respective groove.

17. An anti-friction nut for engagement with an elongate shaft-like member having a groove with opposed walls, said nut comprising in combination:

a) a nut body having an axial bore which is adapted to receive the elongate shaft-like member, b) said nut body having a radial bore communicating with the axial bore thereof, c) an anti-friction roller having at one end a nose portion, d) mounting means including an anti-friction bearing, turnably mounting the roller in the radial bore such that the nose portion of the roller extends into said axial bore and engages one wall of the groove of said elongate shaft-like member, e) a spring carried in the radial bore of the nut body, said spring engaging said bearing and thereby biasing the roller in a radially outward direction away from said elongate shaft-like member, and f) adjustment means carried by the nut body in said radial bore and disposed radially outwardly of said bearing, said adjustment means being operable to positively back up and effect adjustable movement of the roller in radial directions, g) the engagement of said spring with the bearing acting to bias the latter radially outward against said adjustment means so as to take up any looseness of the bearing, h) said adjustment means comprising a plug carried in the radial bore of the nut body, i) said plug having a tool-engageable means by which the plug can be adjustably turned, and j) means rendering said tool-engageable means inoperable following adjustment of the plug, to resist attempts to subsequently turn the plug following adjustment.

18. An anti-friction nut for engagement with an elongate shaft-like member having a groove with opposed walls, said nut comprising in combination:

a) a nut body having an axial bore which is adapted to receive the elongate shaft-like member, b) said nut body having a radial bore communicating with the axial bore thereof, c) an anti-friction roller having at one end a nose portion, d) mounting means including an anti-friction bearing, turnably mounting the roller in the radial bore such that the nose portion of the roller extends into said axial bore and engages one wall of the groove of said elongate shaft-like member, e) a spring carried in the radial bore of the nut body, said spring engaging said bearing and thereby biasing the roller in a radially outward direction away from said elongate shaft-like member, f) adjustment means carried by the nut body in said radial bore and disposed radially outwardly of said bearing, said adjustment means being operable to positively back up and effect adjustable movement of the roller in radial directions, g) the engagement of said spring with the bearing acting to bias the latter radially outward against said adjustment means so as to take up any looseness of the bearing, h) said adjustment means comprising a plug carried in the radial bore of the nut body, and i) adhesive means providing a tamper-resistant seal for said plug, to thereby resist attempts, following adjustment of the plug, to subsequently turn the plug after the adhesive cures.

19. An anti-friction nut for engagement with an elongate shaft-like member having a groove with opposed walls, said nut comprising in combination:

a) a nut body having an axial bore which is adapted to receive the elongate shaft-like member, b) said nut body having a radial bore communicating with the axial bore thereof, c) an anti-friction roller having at one end a nose portion, d) mounting means including an anti-friction bearing, turnably mounting the roller in the radial bore such that the nose portion of the roller extends into said axial bore and engages one wall of the groove of said elongate shaft-like member, e) a spring carried in the radial bore of the nut body, said spring engaging said bearing and thereby biasing the roller in a radially outward direction away from said elongate shaftlike member, and f) adjustment means carried by the nut body in said radial bore and disposed radially outwardly of said bearing, said adjustment means being operable to positively back up and effect adjustable movement of the roller in radial directions, g) the engagement of said spring with the bearing acting to bias the latter radially outward against said adjustment means so as to take up any looseness of the bearing.

* * * * *